United States Patent
Nakajima

[15] 3,694,720
[45] Sept. 26, 1972

[54] SPEED CONTROL FOR D.C. MOTOR
[72] Inventor: Kazuo Nakajima, Kitakyushu, Japan
[73] Assignee: Kabushiki Kaisha Yaskawa Denki Seisakusho, Fukuoka-ken, Japan
[22] Filed: Nov. 13, 1970
[21] Appl. No.: 89,163

[30] Foreign Application Priority Data
Nov. 14, 1969 Japan ....................44/90749

[52] U.S. Cl. ..................................318/308, 318/327
[51] Int. Cl. .............................................H02p 3/04
[58] Field of Search......318/326, 327, 331, 332, 308, 318/345, 257

[56] References Cited
UNITED STATES PATENTS
3,302,089 1/1967 Rosa et al. ...............318/257
3,543,118 11/1970 Koenig...................318/257 X
3,413,534 11/1968 Stringer..................318/326 X
3,293,522 12/1966 Lewis .......................318/327

Primary Examiner—Gerald Goldberg
Assistant Examiner—Robert J. Hickey
Attorney—Ward, McElhannon, Brooks & Fitzpatrick

[57] ABSTRACT

A comtrol system is composed of a saturation amplifier delivering a positive or negative saturated voltage depending on the sign of a difference voltage between a command voltage and a negatively fed back speed-representing voltage of the motor to be controlled, a proportional-intergrating circuit (operable in P-I mode) receiving a difference voltage between the output of the saturation amplifier and a negatively fed back voltage representing the actual armature current through the motor as its input, and a power amplifier in the form of a chopper amplifier operated in a shorter repetition period in comparison with the mechanical time constants of the d.c. motor for supplying an output current to the d.c. motor.

11 Claims, 33 Drawing Figures

FIG. 11(a) INPUT SIGNAL FOR IGNITION CIRCUIT
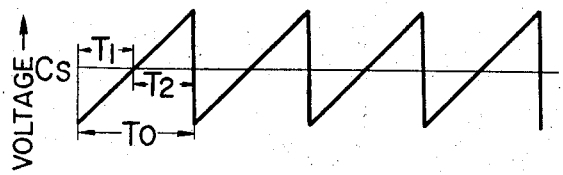
FIG. 11(b) OUTPUT PULSES FROM THE IGNITION PULSE GENERATOR 34
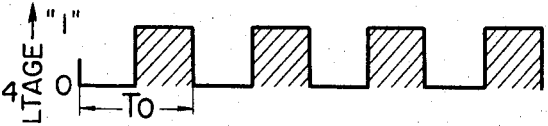
FIG. 11(c) OUTPUT PULSES FROM THE IGNITION PULSE GENERATOR 35
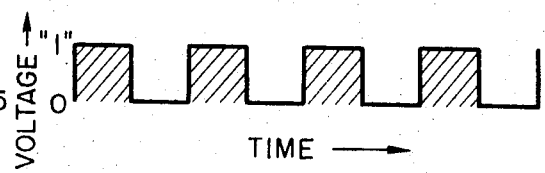
FIG. 11(d) OUTPUT PULSES FROM THE CHOPPER CIRCUIT
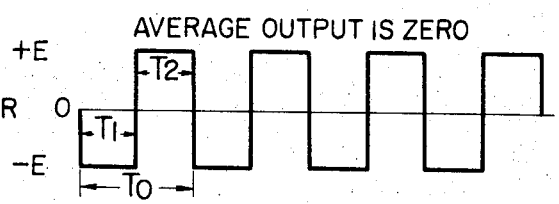
AVERAGE OUTPUT IS ZERO
FIG. 12(a)
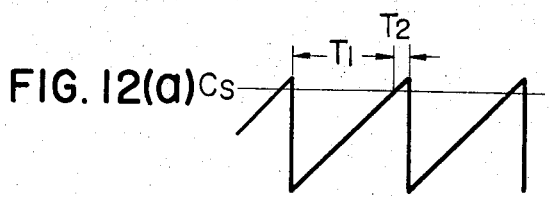
FIG. 12(b)
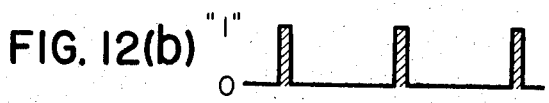
FIG. 12(c)
FIG. 12(d)
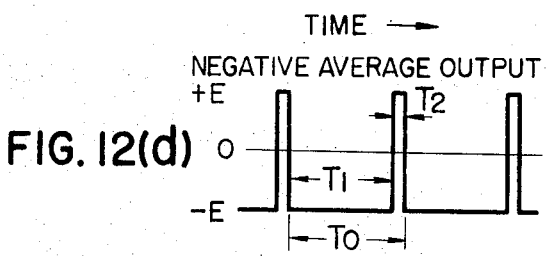
NEGATIVE AVERAGE OUTPUT FIG. 15(a) OUTPUT OF "1" MEMORY 33 WHEN "YES"
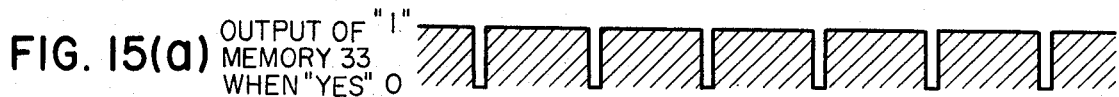
FIG. 15(b) OUTPUT OF "1" MEMORY 33 WHEN "NOT"
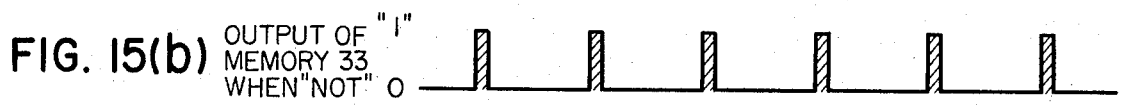
FIG. 15(c) OUTPUT OF "1" THE DISCRIMINATOR 142
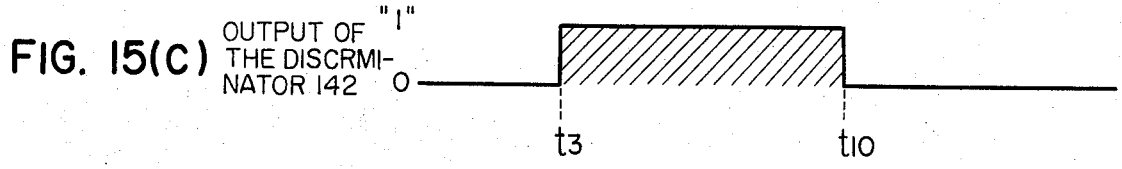
FIG. 15(d) GATING SIGNAL APPLIED TO "1" GATE 144
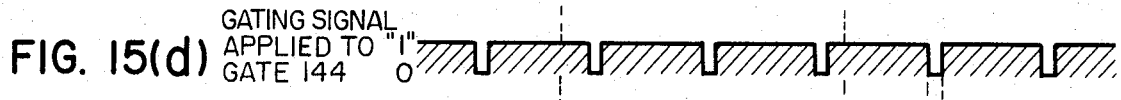
FIG. 15(e) OUTPUT FROM "1" THE GATE 144
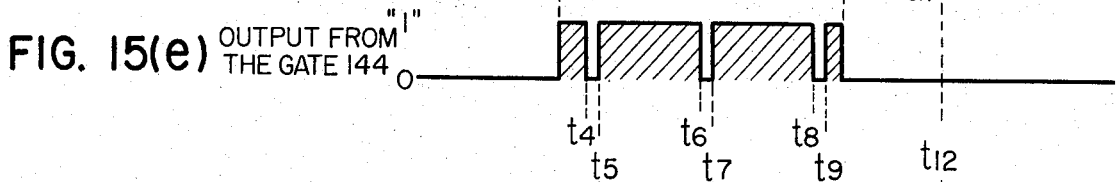
FIG. 15(f) RESET SIGNAL "1" TO THE MEMORY 146
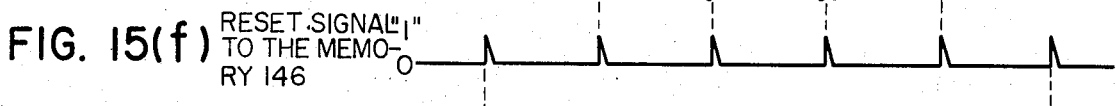
FIG. 15(g) OUTPUT SIGNAL "1" FROM THE MEMORY 146
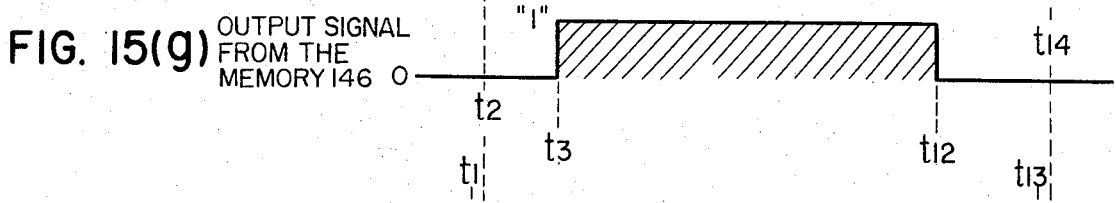
FIG. 15(h) OUTPUT SIGNAL "1" FROM THE GATE 149
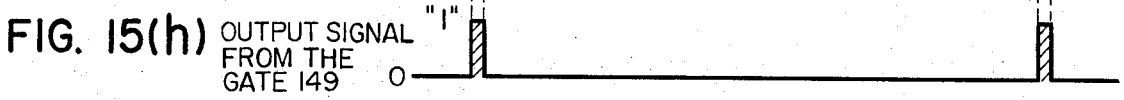
TIME →

SPEED CONTROL FOR D.C. MOTOR

BACKGROUND OF THE INVENTION

This invention relates to speed control systems for d.c. motors and more particularly to a system which affords not only precision control of the d.c. motor speed but also exact control of the motor starting and stopping operations in the normal running direction and the reverse running direction. More specifically, this invention is an improvement of copending U.S. patent application Ser. No. 851,945, filed by Sadaaki Nanai and Nobuhiro Kyura on Aug. 21, 1969.

Although various control systems for d.c. motors have been disclosed heretofore, none of such control systems has yet exhibited satisfactory performance especially in applications thereof to d.c. motors of comparatively large size, for instance, to a motor in a magnetic tape feeding mechanism in an electronic computer wherein an extremely high speed response and capability to fulfill severe controlling conditions are required. The above described copending application discloses a P-I mode control system for a d.c. motor. However, the power amplifier in said control system cannot be made sufficiently powerful, and the response speed thereof cannot be made sufficiently high.

SUMMARY OF THE INVENTION

Therefore the primary object of the present invention is to provide an improved control system for a d.c. motor which, in response to severe commands requiring frequent normal and reversed running and stopping of the motor, affords constant acceleration and constant steady-state speed operation in either of the normal and reverse directions.

Another object of the invention is to provide a speed control system capable of controlling the speed of a d.c. motor in a wide speed range and also of effecting the control with quick response to the above stated severe commands.

Still another object of the invention is to provide an improved control system for a d.c. motor which is capable of controlling the motor speed in a narrow deviation range despite variations in the load torque or in an outside disturbance, with simultaneous preservation of the above described wide control range and quick response characteristics.

An additional object of the present invention is to provide an improved speed control system for a d.c. motor wherein a chopper type power amplifier is employed, and powerful control and quicker response of the d.c. motor are thereby obtained.

These and other objects of the present invention can be achieved by an improved control system for a d.c. motor which comprises a saturation amplifier delivering a positive or negative saturated voltage depending on the sign of a difference voltage between a command voltage and a negatively fed back speed-representing voltage of the motor to be controlled, a proportional-integrating circuit (operable in P-I mode) receiving a difference voltage between the output of the saturation amplifier and a negatively fed back voltage representing the actual armature current in the motor as its input, and a power amplifier amplifying the output of the proportional-integrating circuit for supplying the current for the motor. In the above described organization of the control system according to the present invention, a power amplifier of chopper type is employed instead of the transistor type amplifier or the magnetic amplifier employed in the above described copending application.

The nature, principle, and utility of the invention will be more clearly apparent from the following detailed description with respect to preferred embodiments thereof when read in conjunction with the accompanying drawings.

BRIEF DESCRIPTION OF THE DRAWINGS

In the drawings:

FIGS. 11 through 13 are waveform diagrams for explaining the relations between the input signal, ignition pulses, and the output voltages of the chopper-type amplifier shown in each of FIGS. 8, 9 and 10;

FIGS. 15($a$) through 15($h$) are time charts of outputs of important portions of the control circuit shown in FIG.14.

DETAILED DESCRIPTION OF THE INVENTION

Figure 1:
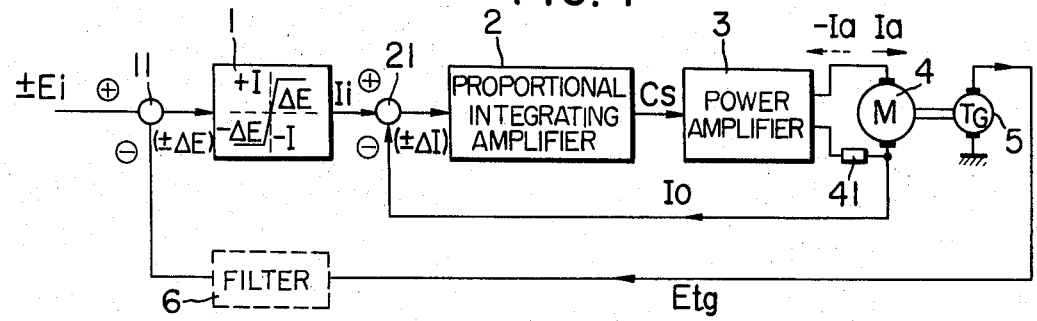
FIG. 1 is a block diagram showing the basic organization of a control system for a d.c. motor according to this invention.

Referring now to FIG. 1, there is indicated a control system for a d.c. motor which constitutes a basic circuit wherein an improvement according to the present invention is contemplated. In this circuit, when a step-formed commanding voltage $+E$ or $-E$ is applied to the input terminal of the control system, the speed of the d.c. motor 4 is varied to $+N$ or $-N$ following the sequential variations of acceleration, constant speed running, and deceleration, or acceleration, deceleration, and reversing, and the armature current will be $+Ia$, $O$, or $-Ia$.

In the control system of FIG. 1, there are provided a saturation amplifier 1, a proportional-integrating circuit 2 (operable in P-I mode), a power amplifier 3 for driving the d.c. motor upon reception of an input signal $Cs$, and the d.c. motor 4 having a low moment of inertia and controlled by the control system according to the present invention. The rotating shaft of the d.c. motor 4 is coupled to a tachometer generator 5, and the output from the tachometer generator 5 is fed back to the input side of the control system through a filter 6. At the input side and the output side of the saturation amplifier 1, operators 11 and 21 are provided respectively. The operator 11 receives a commanding voltage $Ei$ and the fed-back valtage $Etg$ from the tachometer generator 5 and delivers an output signal equal to the differences voltage $\Delta E$ of the above mentioned two input voltages.

Figure 2:
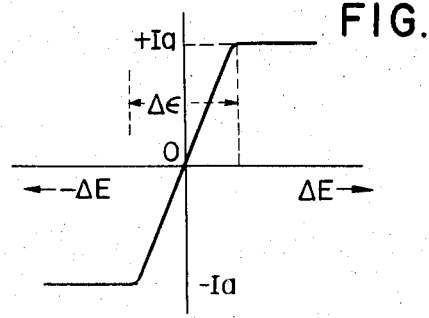
FIG. 2 is an expanded representation of the input-output characteristic of the saturation amplifier shown in FIG. 1.

The saturation amplifier 1 acts as a switching amplifier and the input-output characteristic thereof is indicated in FIG. 2. It should be noted that when the above mentioned difference voltage falls within the range $\Delta\epsilon$, the difference voltage $\Delta E$ is proportionally amplified. The range $\Delta\epsilon$ is selected to be equal to a value corresponding to the desired tolerance of the control system, and by selecting the range $\Delta\epsilon$ at a smaller value, harmful effects such as ripple or noise of the tachometer generator 5 can be eliminated. The difference voltage $\Delta I$ between the output voltage $Ii$ of the amplifier 1 and the voltage component $Io$ of the armature current (+I or -I) of the motor 4 is applied to the input side of the P-I circuit 2, and the power amplifier 3 is driven by the output voltage of the P-I circuit 2. The armature current $Ia$ or $-Ia$ of the motor 4 is thus controlled.

A resistor 41 is used to pick up the voltage $Io$, and the filter 6 is employed for eliminating resonance frequencies which may be created at the time a mechanical resonance occurs in the tachometer generator portion.

Figure 3:
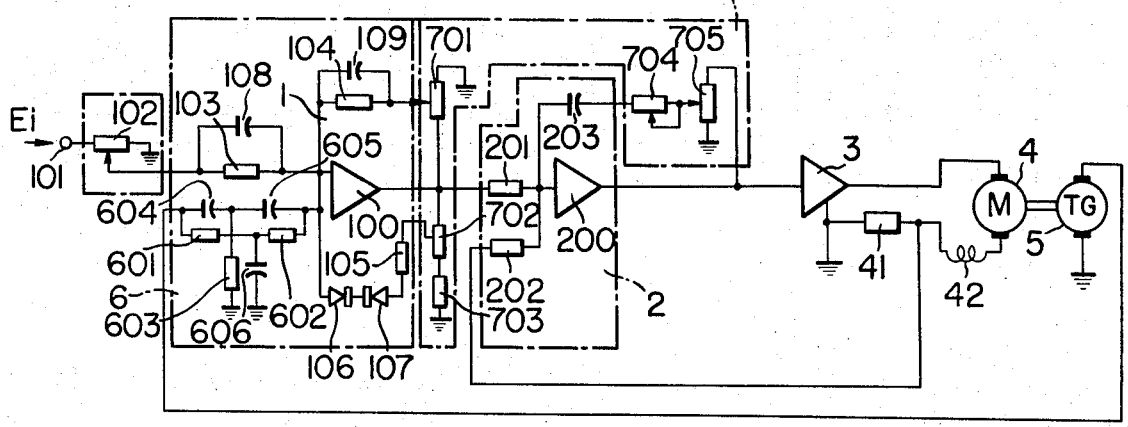
FIG. 3 is a circuit diagram of the control system shown in FIG. 1, partly indicated in detail.

FIG. 3 indicates the saturation amplifier 1 and the P-I circuit 2 of the control system in more detail. The command voltage $Ei$ is applied to an input terminal 101. The principal components of these circuits are resistors 102 through 105, 601 through 603, 701 through 705, 201, and 202, capacitors 108, 109, 604 through 606, and 203; Zener diodes 106 and 107; and high-gain sign-converting amplifiers 100 and 200.

When the resistor 701 in the adjusting section 7 is adjusted, the above mentioned voltage difference $\Delta E$ can be regulated, and by the adjustment of the resistor 702, the saturated value of the output voltage $Ii$ of the amplifier 1 can be regulated. Likewise, the integrating time-constant of the P-I circuit 2 can be regulated by adjusting the resistors 704, 705 in the adjusting portion 7. A reactor 42 is inserted in series with the armature circuit of the motor 4. When the above described mechanical oscillation occurs, the harmful effect can be eliminated by somewhat expanding the voltage $\Delta E$ corresponding to the linear portion of the characteristic of the amplifier 1.

According to the present invention, in addition to the above described circuit components, and integrating amplifier having a reset time is provided between the motor 4 and the amplifier 1, so the P-I operation is achieved with respect to the armature current $Ia$ of the motor 4. For this reason, initial response of the current $Ia$ with respect to the command input current $Ii$ will have no attenuation, and a similar stepped output can be obtained with respect to a stepped input. Since a feedback with respect to a speed is provided outwardly of the control system, the differential of the voltage will be $$\Delta E = Ei \cdot S/(S+C)$$

wherein, $S$ is a Laplacean operator, and $C$ is a constant. Accordingly, with respect to the stepped command voltage $Ei = 1/S$, an ultimate deviation of $$\lim_{t \to \infty} \Delta E = \lim_{s \to 0} \frac{S}{S} \frac{S}{S+C} = 0$$

can be obtained. Since the amplifier 1 is a switching amplifier of saturable type, the response of the system can be made extremely rapid, whereby an optimum system of fastest response can be realized.

Figure 4:
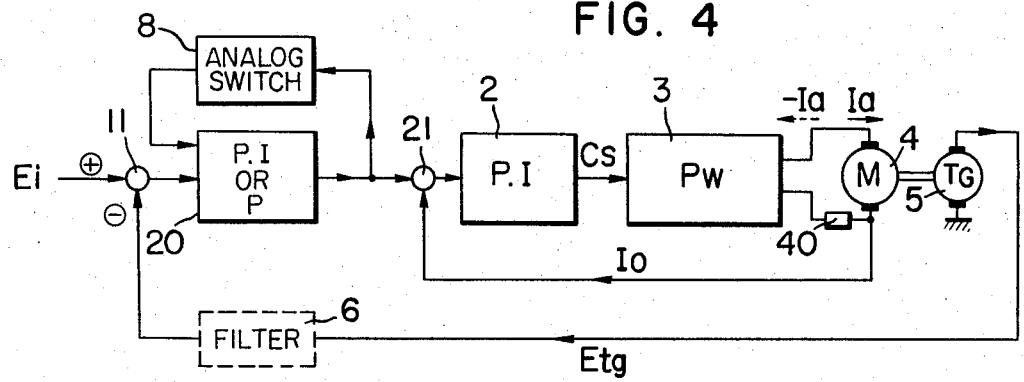
FIG. 4 is a block diagram of a control system for a d.c. motor partly modified and also employed in this invention with the power amplifier modified according to the present invention.

A block diagram for another example of the basic control system is shown in FIG. 4. In this example, instead of the switching amplifier 1 of the first example, a proportional-integrating circuit 20 is provided, and an analog-switch 8 operated by the output of the proportional-integrating circuit transfers the operational characteristic of the thus provided proportional-integrating circuit 20 between a proportional-integrating mode and an integrating mode. More specifically, at the time of starting or stopping operation of the motor wherein a limitation of the armature current is required, the control system is operated in the proportional mode (P-mode), and during the rest of the time, the control system is operated in the proportional-integrating mode (P-I mode) by means of the analog-switch 8 provided at a preceding stage of the control system. Thus, in the second example of the control system, it will be apparent that the above mentioned difference voltage E can be reduced to zero regardless of variation in the load torque, and also that the steady-state deviation can be theoretically nulified even in the case where the load torque is varied stepwisely.

However, for the purpose of resticting the command current to a constant value, a saturating characteristic must be imparted to the portion of the circuit operating in the P-I mode, and when the circuit portion operates in a P-I mode also having a saturation characteristic, the time instant at which the operational characteristic leaves the saturating region is delayed because of the charging current flowing into the feedback capacitor (109 in FIG. 5) during its saturating period. For this reason, the response at the time of starting and stopping of the motor 4 is seriously impaired.

To prevent this deterioration of response and, furthermore, to improve the steady-state characteristic of the control system, the proportional-integrating circuit 20 is made operable in either the proportional mode having a saturation or in the proportional-integrating mode, and switching between these operational modes is carried out depending on the commanding current value for a motor 4. When the commanding current value is lower than a value determined from the accelerating current and the rated current of the motor 4 (the accelerating current <2 x rated current), the circuit 20 operates as a proportional-integrating element, and when the commanding current valve is higher than the above mentioned valve determined from the accelerating current and the rated current of the motor 4, the circuit 20 operates as a proportional element having saturation.

Figure 5:
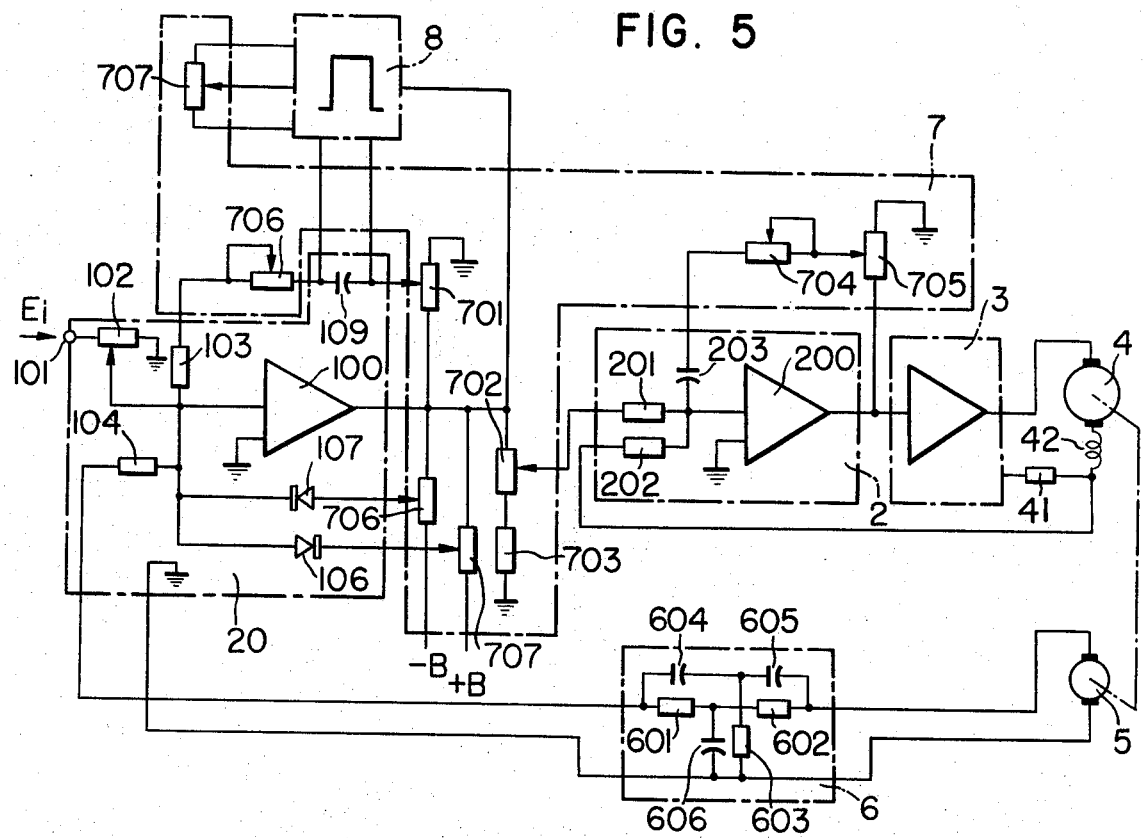
FIG. 5 is a circuit diagram of the control system shown in FIG. 4 partly indicated in detail.

FIG. 5 shows a circuit diagram of a control circuit corresponding to the second example shown in FIG. 4, wherein the first stage and the second stage of the circuit are indicated in more detail. Elements similar to or corresponding to those in the first and the second examples of the control system shown in FIGS. 3 and 4 are designated by like reference numerals. The circuit is provided further with resistors 706 and 707 and a capacitor 107 so arranged as to be short circuited when the output of an amplifier 100 in the circuit 20, that is, the input of the analog switch 8 (which is proportional to the armature current of the motor 4) falls within an amplitude around a central value of zero, and the amplitude is pre-determined by the resistor 707 acting as a regulator.

Figure 6:
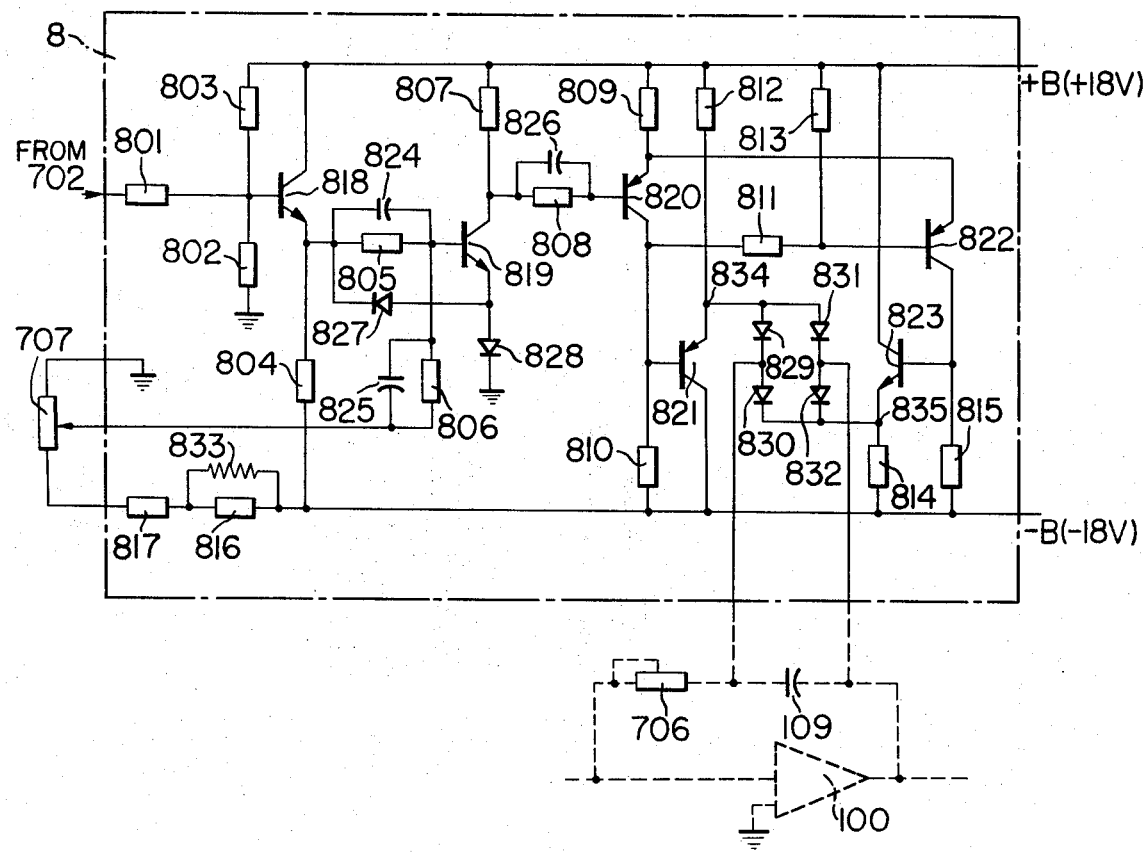
FIG. 6 is a detailed circuit diagram for a switching circuit which accomplishes "ON-OFF" control of the integrating operation of the proportional-integrating circuit employed in the control system shown in FIG. 4.

In FIG. 6, FIG. 6 there is indicated in detail the organization of the analog switch 8 which comprises resistors 801 through 817, transistors 818 through 823, capacitors 824 through 826, diodes 827 through 832, and a temperature compensating thermistor 833. With these circuit components, a synchronized switching circuit consisting mainly of a bridge circuit made up of the diodes 827 through 832 is organized. When a signal exceeding a predetermined value arrives at the input terminal resistance 801, the output voltages of the transistors 818 through 820 are raised to higher levels as desired, which in turn elevate the emitter potential of the transistor 821 (or the junction point 834), whereby the transistor 822 is brought into "OFF" state, and the transistor 823 is supplied with a low voltage from the power source −B (−18V). As a result, the potential of the junction point 835 is lowered, and a current flows from a point 834 to a point 835. Thus, a voltage across the capacitor 109 connected to a bridge circuit of the diodes 829 through 832 is short circuited through the power source (−B and +B), and, thus, the element 20 does not operate in the integrating mode but operates in a quick response proportional mode.

On the other hand, when the signal applied to the resistor 801 is less than a predetermined value, the transistor 822 is brought into "ON" state, thereby elevating the potential of the junction point 835 and lowering the potential of the junction point 834, and the bridge circuit consisting of the diodes 829 through 832 blocks the current from flowing from the point 843 to the point 835, whereby the capacitor 109 performs its integrating function.

Figure 7:
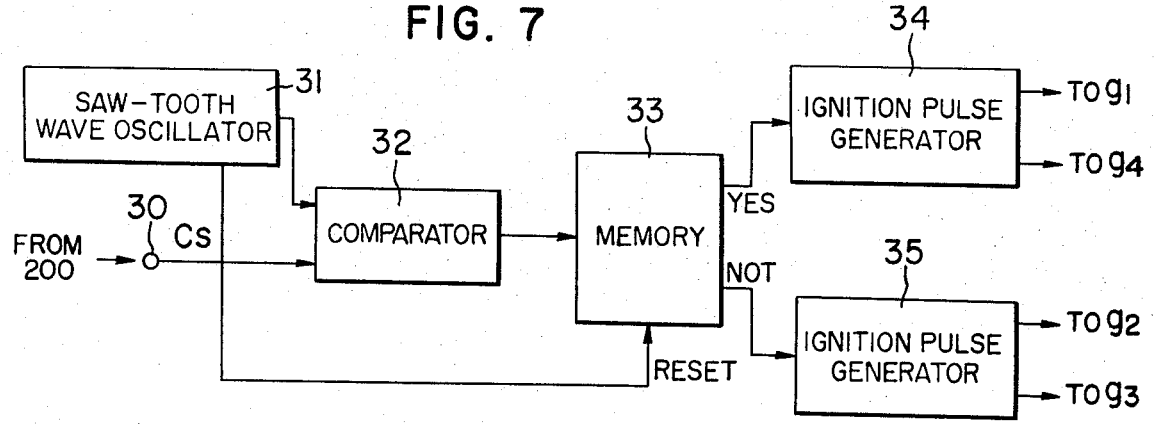
FIG. 7 is a block diagram showing a control circuit for the chopper-type power amplifier according to the present invention.

Referring to FIG. 7, there is illustrated a driving circuit for the power amplifier circuit shown in FIGS. 1 and 4, which is, according to the present invention, arranged in the form of a chopper amplifier for operating the d.c. motor 4. The driving circuit includes an input terminal 30 to which the output control signal Cs from the proportional-integrating circuit 200 in FIG. 5 is applied, a saw-tooth wave oscillator 31 generating a saw-tooth wave of a constant frequency, and a comparator 32 for comparing the input signal Cs with the output of the saw-tooth wave oscillator 31. The driving circuit further includes a memory device 33, for instance, of a flip-flop type, and a pair of ignition pulse generators 34 and 35 for generating ignition signals to be applied to the gate circuits of thyristor choppers.

Figure 8:
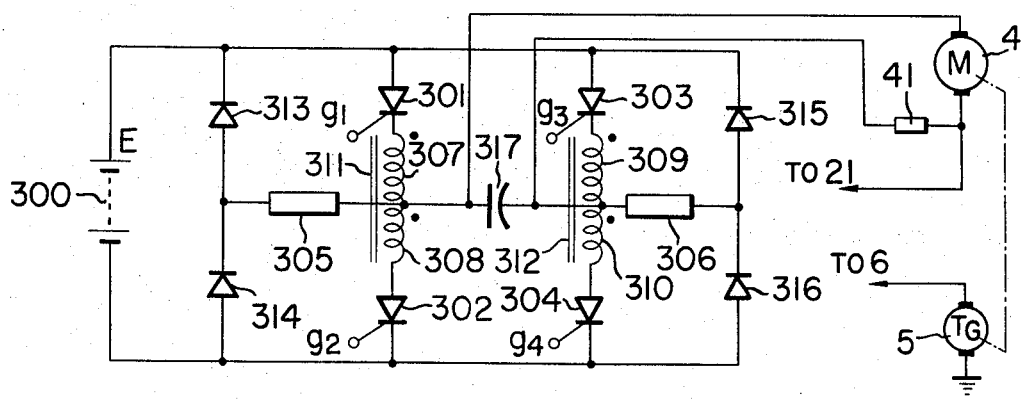
FIGS. 8, 9 and 10 are circuit diagrams of the first, second, and third embodiments of the chopper-type power amplifier according to the present invention.

In FIG. 8, there is illustrated a circuit diagram of a power amplifier consisting of thyristor choppers cooperating with the driving circuit shown in FIG. 7. In this embodiment of the present invention, a d.c. power source 300 is connected across a pair of feedback diodes 313 and 316 which are in turn connected across the bridge connected thyristors 310 through 304 having gate terminals $g_1$ through $g_4$ respectively. Furthermore, the chopper amplifier includes resistors 305, 306, feedback diodes 313 through 316, commutating reactors 307 through 310, a commutating capacitor 317, and a commonly provided magnetic path designated by numerals 311 and 312.

In the circuit shown in FIG. 8, the gate electrodes $g_1$ and $g_4$ are supplied with ignition pulses from the ignition pulse generator 34 in FIG. 7, and the gate electrodes $g_2$ and $g_3$ are supplied with ignition pulses from the ignition pulse generator 35 also shown in FIG. 7.

Figure 9:
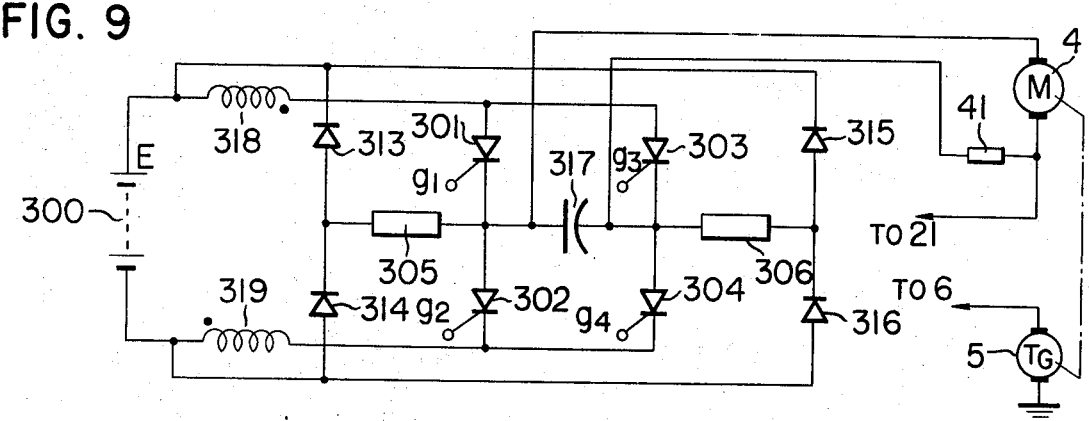

In FIG. 9, there is indicated a circuit diagram of a power amplifier circuit constituting another embodiment of the present invention, in which commutating reactors 318 and 319 are employed instead of the commutating reactors 307 and 310 shown in FIG. 8, and the reactors 318 and 319 are not necessarily magnetically coupled with each other.

Figure 10:
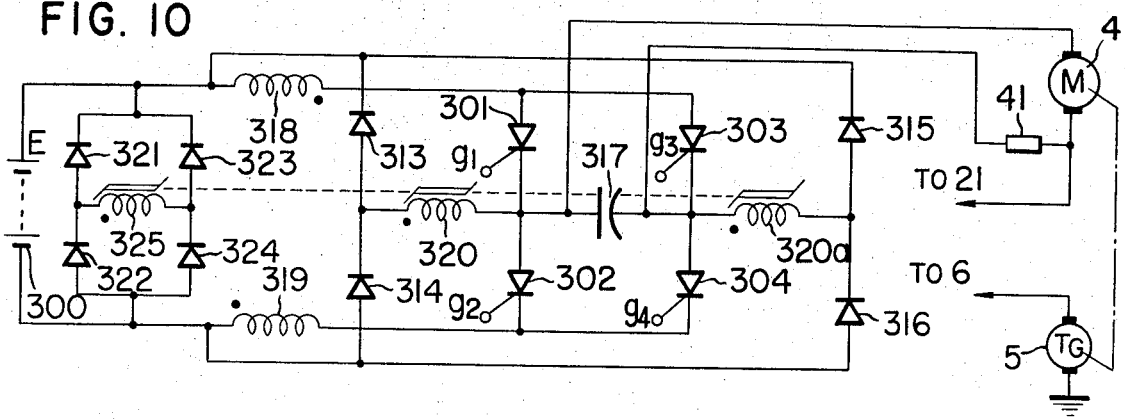

In FIG. 10, there is indicated a power amplifier circuit constituting still another embodiment of the invention, wherein instead of the resistors 305 and 306 shown in FIG. 9, saturable reactors 320, 320a, and 325 wound on a single magnetic core are provided, and a bridge circuit of diodes 321 through 324 is also provided across one of the commutating reactor 325, whereby the commutating energy of the thyristors 301 through 304 is allowed to be fed back to the power source 300. The dot (·) symbol on one end of each of these reactors represents the starting end of the windings of these reactors. In these embodiments of the invention shown in FIGS. 8 and 9, the energy stored in the commutating reactors 307 through 310 or 318 and 319 is consumed in the dummy resistors 305 and 306 as Joule heat.

In contrast with the above described two embodiments, the third embodiment of the invention shown in FIG. 10 does not generate Joule heat, but the energy stored in the commutating reactors is fed back to the d.c. power source 300.

In FIGS. 11(a) through 11(d), there are indicated waveform diagram of input signals for the comparison circuit 32 and output ignition signals from the ignition circuit shown in FIG. 7 and also output waveforms of the chopper circuits shown in FIGS. 8, 9 and 10. Although the one-cycle period $T_o$ (= $T_1 + T_2$) of the saw-tooth wave is a constant value, if the mixing ratio between the saw-tooth wave and the input signal Cs, both of which are applied to the input terminals of the comparison circuit 32, is selected at a suitable value, the periods T1 and T2 shown in FIG. 11(d) which correspond to the periods of a negative voltage −E and a positive voltage +E, respectively, obtained from each of the chopper circuits shown in one of FIGS. 8, 9 and 10 can be controlled as desired as clearly seen in FIGS. 12(a) through 12(d) or in FIGS. 13(a) through 13(d), whereby the average output voltage obtained from any of the chopper circuits can be varied between 0 and a positive or negative value, as follows, depending on the variation of the time periods T1 and T2.

1. When T1 = T2, the average output voltage from the chopper is 0.
2. When T1 < T2, the average output voltage from the chopper is a positive value.
3. When T1 > T2, the average output voltage from the chopper is a negative value.

Thus, if the period To is selected to a sufficiently small value in comparison with the mechanical constants of the d.c. motor 4, 1. the d.c. motor 4 will be stopped in the case of the above condition (1),
2. the d.c. motor 4 will be rotated positively in the above condition (2), and
3. the d.c. motor 4 will be rotated negatively in the above condition (3).

Furthermore, when the period To is selected to be a small value, any a.c. component flowing through the d.c. motor 4 can be limited through a small inductance of the load circuit, and any harmful effect thereof can be practically eliminated.

Accordingly, in the example shown in FIG. 8 in its stationary condition, the positive average output current for the d.c. motor 4 is passed from the positive terminal of the d.c. power source 300 → thyristor 301 → reactor 307 → the d.c. motor 4 → reactor 310 → thyristor 304 → to the negative terminal of the d.c. power source 300.

Likewise, in the case of the negative average output voltage, the current for the d.c. motor 4 is passed from the positive terminal of the d.c. power source 300 → thrystor 303 → reactor 309 → d.c. motor 4 → reactor 308 → thyristor 302 → to the negative terminal of the d.c. power source 300.

In the driving circuit shown in FIG. 7, a memory 33 is provided so that it may be reset by the saw-tooth wave applied to the memory 33 and any elevation of the operating frequency of the chopper circuit shown in FIG. 8 or 10 higher than that of the saw-tooth wave is thereby prevented.

Figure 13A:
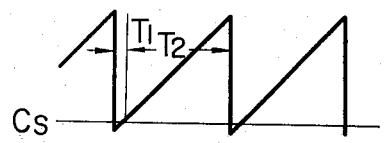
Figure 13B:
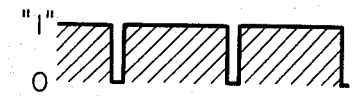
Figure 13C:
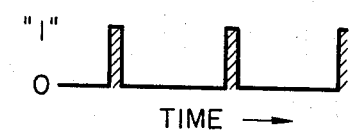
Figure 13D:
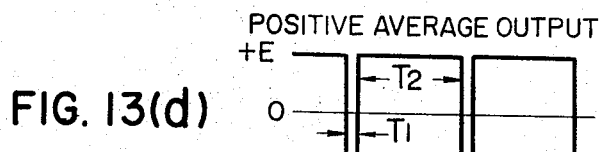

Since there is a limitation in the minimum value of the period T1 shown in FIG. 13(d) determined from the commutating condition of the thyristors, the upper limit Ea for the controllable range, at the time the frequency of the saw-tooth wave is maintained to a constant value, is determined as follows by the minimum value $T1_{min}$ of the period T1.

$$Ea = \frac{To - 2T1_{min}}{To} E$$

Figure 16:
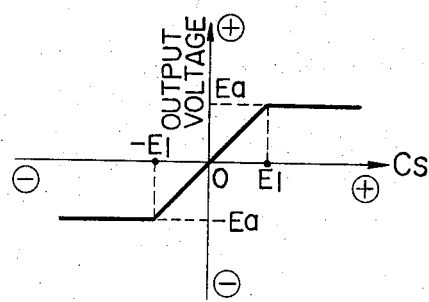
FIGS.16 and 17 are explanatory diagrams showing static characteristics of average output voltages which are obtained respectively from the chopper amplifiers in accordance with the input signals applied to the control circuits shown in FIGS. 7 and 14.

The lower limit −Ea of the operational range can be obtained in a similar manner by substituting $T2_{min}$ in place of $T1_{min}$ in the above equation. Thus, when the control circuit shown in FIG. 7 is employed, an output characteristic as shown in FIG. 16 having a controllable range of from −Ea to +Ea can be obtained. Furthermore, when $T1_{min}$ (or $T2_{min}$ in the case of the lower limit is considered) is a constant, the controllable range is made narrower with an increase in the saw-tooth wave frequency.

Figure 14:
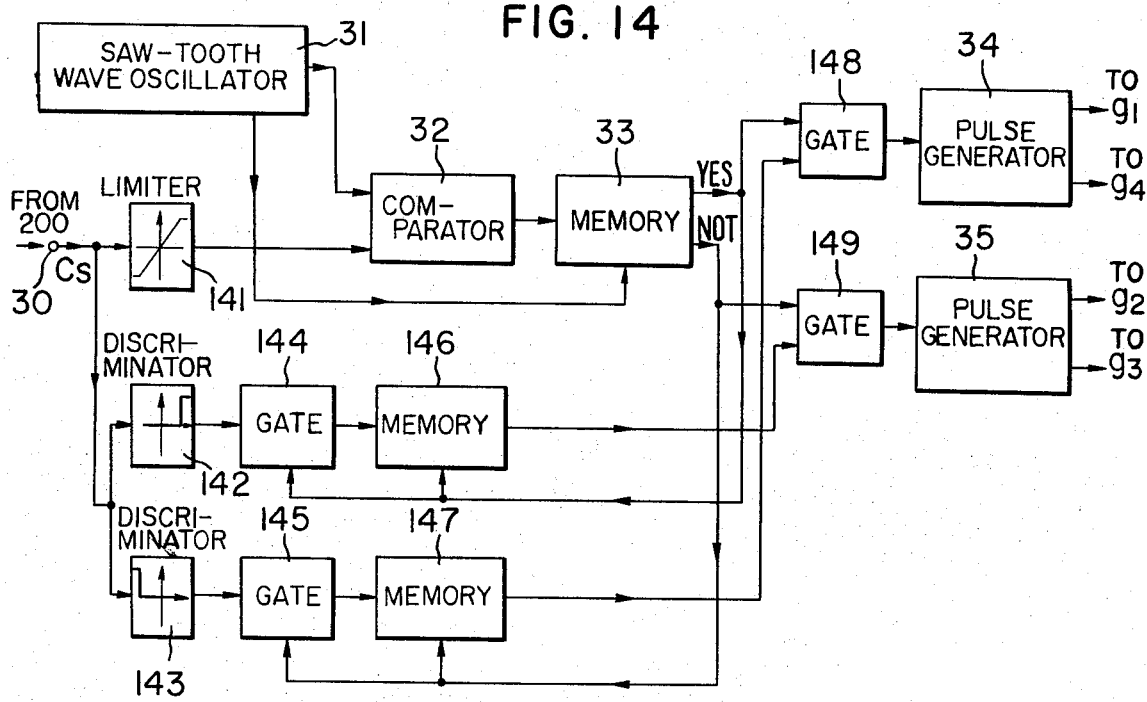
FIG.14 is a block diagram showing another example of the control circuit shown in FIG. 7, whereby the controllable range of the input signal can be further expanded.

The above described disadvantage of the power amplifier circuit shown in FIGS. 8, 9 and 10 can be eliminated by employing the circuit shown in FIG. 14. In this circuit, there are provided a limiter 141, discriminators 142 and 143 which can pass input signal Cs when the value of Cs exceeds a positive limitation set for the discriminator 142 or when the input signal Cs exceeds the negative limitation set for the discriminator 143, and gate devices 144 and 145 which are operable to open their gates in response to a "YES" signal from the memory 33.

The circuit has other memory devices 146 and 147 each including a differentiating circuit for creating reset pulses in correspondence with the rising portions of the "YES" and "NOT" output signals delivered from the memory 33. With the reset pulses, the signals passed through the gates 144 and 145 at the preceding stage of the memory devices 146 and 147 and stored in these memory devices 146 and 147 are thereby reset.

In the circuit shown in FIG. 14, there are also provided other gate devices 148 and 149 which, in response to the output signals from the memory devices 147 and 146, respectively, block the "YES" or "NOT" signal delivered from the memory device 33 from being passed to the impulse generators 34 and 35. More specifically, sampling of the input signal is carried out by the discriminators 142, 143 and the related circuits 144 through 147, at a frequency equal to that of the saw-tooth wave, and the output of the memory device 33 is controlled by the output signals from the memory devices 146 and 147.

Figure 17:
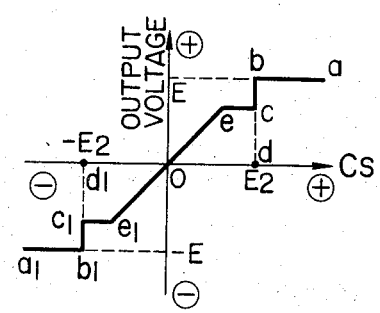

In FIG. 15, there are indicated time sequences of the operations of the circuit elements 142 through 147 when the input signal Cs exceeds a positive limitation set in the limiter 141 for a period starting from an instant $t_3$ to another instant $t_{10}$. As is apparent from these diagrams shown these in FIG. 15, the output signal from the gate device 149 is deleted even in the time periods corresponding to those from $t_4$ to $t_5$, from $t_6$ to $t_7$, from $t_8$ to $t_9$, and from $t_{11}$ to $t_{12}$. Thus, although the controllable range in the control circuit shown in FIG. 7 is from −Ea to +Ea and has a linear characteristic as shown in FIG. 16, the controllable range in the circuit of FIG. 14 is expanded stepwisely to a range starting from −E to +E as shown in FIG. 17. Both diagrams in FIGS. 16 and 17 are represented on the same scale, and, of course, the voltage Ea is less than the voltage E.

Thus, the characteristic of $a$-$b$-$c$-$e$-$o$-$e_1$-$c_1$-$b_1$-$a_1$ shown in FIG. 17 is obtained by combining two characteristics such as $c$-$e$-$o$-$e_1$-$c_1$ shown in FIG. 16 and $a$-$b$-$d$-$c$-$d_1$-$b_1$-$a_1$ having an "ON-OFF" characteristic, whereby the controllable range of the control circuitis is expanded from the range from −Ea to +Ea to another range from −E to +E, so that 100 percent of the power source voltage can be utilized.

The chopper amplifier and the related control circuit are not restricted to those embodiments shown in FIGS. 8 through 10 and in FIGS. 7 and 14, and the frequency of the saw-tooth wave oscillator 31 is set a value from several hundred Hz to several thousand Hz in consideration of the moment of inertia of the d.c. motor 4, of the required control characteristics of the same motor, for instance, stiffness, and of the turn-off time of the thyristors. The control range of the d.c. motor 4 may also be expanded by lowering the frequency of the saw-tooth wave generated from the saw-tooth wave oscillator 31 as described above.

Furthermore, as is apparent from the above description, the control system for a d.c. motor according to the present invention, wherein chopper circuits are employed in the power amplifier thereof, affords rapid response of the controlled motor with respect to frequency altered severe command signals, and an economical and simplified organization of the control system is thereby realized.

I claim:

1. A speed control system for a d.c. motor comprising an amplifier (1) which, is depending on whether the sign of a difference voltage between a command voltage (E$i$) and a negatively fedback voltage corresponding to the speed of the motor (4) is positive or negative, delivers a positively or negatively saturated output voltage (I$i$) for controlling the armature current of the motor (4), the amplitude of said saturated voltage (I$i$) being adjustable to a desired value, a proportional-integrating circuit (2) which receives a difference voltage between said output voltage (I$i$ and a voltage (I$o$) corresponding to the actual armature current of the motor (4) as its input, a power amplifier (3) which is formed by a chopper circuit operated with an operational period smaller than those corresponding to mechanical time constants of the motor portion, each operational period of said chopper circuit comprising a positive pulse and negative pulse, the relative durations of which are controlled by the output of said proportional-integrating circuit (2) to supply an amplified armature current for the motor (4), and a gate circuit comprising a limiter (141), an upper limit discriminator (142), and a lower limit discriminator (143), all connected in parallel whereby the controllable range of the output voltage of the chopper circuit is further expanded stepwisely.

2. A speed control system as defined in claim 1 wherein said chopper circuit is driven by an ignition pulse generating circuit the frequency of which is defined as a predetermined frequency.

3. A speed control system as defined in claim 1 wherein the commutating energy stored in the chopper circuit is converted into Joule heat in a dummy resistor.

4. A speed control system as defined in claim 1 wherein the commutating energy stored in the chopper circuit is fedback to a d.c. power source (300).

5. A speed control system as defined in claim 1 wherein the operating one-cycle period of the chopper circuit is made variable.

6. A speed control system for a d.c. motor comprising: a first circuit (20) which receives a difference voltage ($\Delta E$) between a command voltage (E$i$) and a negatively fedback voltage corresponding to a voltage (E$tg$) representing the rotating speed of the d.c. motor (4) as its input for performing a proportional-integrating operation; a second circuit (2) which receives a difference voltage between the output of said first circuit (20) and a negatively fedback voltage (I$o$) corresponding to an armature current flowing through the motor (4) as its input and performs a proportional-integrating operation; a power amplifier (3) which is composed by a chopper circuit operated with an operational period smaller than those corresponding to mechanical time constants of the motor portion for amplifying the output of said second proportional-integrating circuit (2); and a mechanism (8) which prevents the integrating action of said first circuit (20) when the output of the circuit (20) or the armature current (I$a$) of the motor (4) exceeds a predetermined value; whereby the d.c. motor (4) is driven by the output of said power amplifier (3).

7. A speed control system for a d.c. motor as defined in claim 6 wherein said chopper circuit is driven by an ignition pulse generating circuit the frequency of which is defined as a predetermined frequency.

8. A speed control system for a d.c. motor as defined in claim 6 wherein the commutating energy stored in the chopper circuit is converted into Joule heat in dummy resistors (305 and 306).

9. A speed control system for a d.c. motor as defined in claim 6 wherein the commutating energy stored in the chopper circuit is fedback to a d.c. power source (300).

10. A speed control system for a d.c. motor as defined in claim 6 wherein a gate circuit comprising a limiter (141), an upper limit discriminator (142), and a lower limit discriminator (143), all connected in parallel, is further provided for expanding the controllable range of the output voltage of the chopper circuit stepwisely.

11. A speed control system for a d.c. motor as defined in claim 6 wherein the operating one-cycle period of the chopper circuit is made variable.

* * * * *